US005397813A

United States Patent [19]
Eckberg et al.

[11] Patent Number: 5,397,813
[45] Date of Patent: Mar. 14, 1995

[54] PREMIUM RELEASE UV CURABLE EPOXYSILICONE COMPOSITIONS

[75] Inventors: Richard P. Eckberg, Saratoga Springs, N.Y.; Roy Griswold, Isezaki, Japan

[73] Assignee: General Electric Company, Waterford, N.Y.

[21] Appl. No.: 151,702

[22] Filed: Nov. 12, 1993

[51] Int. Cl.$^6$ ................................................ C08F 2/46
[52] U.S. Cl. ........................................ 522/31; 522/170
[58] Field of Search ................................. 522/31, 170

[56] References Cited

U.S. PATENT DOCUMENTS

| | | | |
|---|---|---|---|
| 3,816,282 | 6/1974 | Viventi | 204/159.13 |
| 4,256,870 | 3/1981 | Eckberg | 528/15 |
| 4,297,717 | 7/1981 | Eckberg et al. | 204/159.13 |
| 4,547,431 | 10/1985 | Eckberg | 522/31 |
| 4,994,299 | 2/1991 | Stein | 522/170 |
| 5,034,491 | 7/1991 | Wewers et al. | 528/41 |
| 5,057,358 | 10/1991 | Riding | 522/170 |

Primary Examiner—Marion E. McCamish
Assistant Examiner—Mark A. Chapman

[57] ABSTRACT

Blends of high viscosity epoxysilicone polymers prepared from pre-crosslinked silicones with polyalkylsiloxy polymers containing long chains of non-functionalized polyalkylsiloxy groups and an effective amount of a suitable iodonium photocatalyst provide an ultraviolet curable low release silicone coating composition.

9 Claims, No Drawings

PREMIUM RELEASE UV CURABLE EPOXYSILICONE COMPOSITIONS

BACKGROUND OF THE INVENTION

This invention relates to improved ultraviolet light curable silicone release coating compositions. More particularly, it relates to blends of pre-crosslinked epoxy functional polydiorganosiloxane silicone polymers fluids which incorporate long chain polydimethylsiloxane blocks in their molecular structure along with lower molecular weight linear epoxyfunctional silicone polymers. Such blends are efficiently crosslinked when irradiated with ultraviolet light in the presence of compatible cationic photocatalysts and are particularly well suited for paper release applications.

Silicone compositions have long been used for rendering surfaces non-adherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is an inefficient process as the solvent must thereafter be evaporated. The evaporation of solvent requires large expenditures of energy. Additionally, pollution abatement procedures require that solvent vapors be prevented from escaping into the air. Removal and recovery of all of the solvent entails considerable expenditure for apparatus and energy.

It has been thus noted that there is a need to provide a solventless coating composition that will however remain easy to apply to the substrate. Such solventless coating compositions are sometimes referred to as "100% solids" compositions. The absence of solvent in such compositions lowers the amount of energy required to effect a cure and eliminates the need for expensive pollution abatement equipment. The present invention provides an improved solvent-less pre-crosslinked epoxy functional polydiorganosiloxane fluid that will cure to a non-adherent surface when combined with an effective amount of a linear alkylate diaryl iodonium salt and exposed to ultraviolet radiation.

Epoxy functional; silicone release agents are constrained by the need to balance both fast cure and photocatalyst miscibility with a low force or premium release. Good release performance coupled with an efficient photocure response is obtained when the epoxy equivalent weight is held between about 800 and about 1600. If the epoxy group in the epoxy-silicone is derived from 4-vinylcyclohexene oxide (VCHO), then the organofunctional content of the silicone must therefor vary between about 8 and about 16 weight percent. A high epoxy content, one that is above about 16 weight percent in cured epoxy-silicone coatings fails to release properly, while low epoxy contents, below about 8 weight percent in cured epoxy-silicone coatings results in a slow curing coating that suffers from an additional problem in that the iodonium catalyst tends to rapidly settle out of the silicone fluid upon standing.

Release coatings are useful for many applications whenever it is necessary to provide a surface or material that is relatively non-adherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar ® and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the non-adhesive side of the tape with a silicone release composition that will come into contact with the adhesive as the roll of tape is manufactured.

Silicone release compositions are often sold as dispersions of reactive polysiloxanes in organic solvents such as toluene, or as emulsions in water. A cross-linking catalyst, also known as the curing agent, is then added to the polysiloxane-solvent mixture. The coating compositions is applied to a substrate which is passed through an oven to evaporate the carrier fluid and cure the silicone to an non-adherent or "adhesive" surface. As noted above, this process is quite energy intensive since it requires high oven temperatures to evaporate the solvent and effect the cure at commercially useful speeds.

Use of these solvent based products is becoming increasingly unattractive because of rising energy costs and stringent regulation of solvent emissions into the atmosphere. Other solventless silicone release compositions such as that described in U.S. Pat. No. 4,256,870 herein incorporated by reference have addressed the environmental problem of hydrocarbon emission but still require high oven temperatures for proper cure.

Optimum energy savings as well as necessary ecological considerations are both served by radiation curable compositions. Specifically, an ultraviolet (UV) radiation curable 100% solids silicone release system eliminates the need for high oven temperatures and for expensive solvent recovery systems, and is, therefore, a useful and commercially desirable product.

UV curable silicone compositions are not unknown. A patent issued to R. V. Viventi, U.S. Pat. No. 3,816,282, Jun. 11, 1974, and assigned to the General Electric Company, describes a room temperature vulcanizable silicone composition (RTV) in which a mercaptoalkyl substituent attached to polysiloxanes add to vinyl functional siloxanes in a free-radical process upon UV irradiation in the presence of free-radical type photosensitizers. The particular compositions described by Viventi cure too slowly to be useful for paper release applications. Furthermore, the use of mercaptoalkyl photoreactive substituents gives rise to offensive odors both in product manufacture and in cured materials.

Ultraviolet radiation will initiate free-radical crosslinking in the presence of common photosensitizers which are well-known to persons familiar with the art of radiation curing mechanisms. However, silicone compositions that utilize photosensitizers (such as benzophenone) as a curing agent also require stabilizers (such as hydroquinone) to prevent premature reaction and provide reasonable shelf-life.

Commonly available photosensitizers are only slightly soluble in polydimethylsiloxane fluids which are the basic starting materials for silicone coating compositions. Low solubility of these photosensitizers causes problems in selection of the necessary ingredients. A further difficulty inherent in free-radical systems is oxygen inhibition which necessitates that the coated substrates be under an inert atmosphere while undergoing irradiation in order to cure within a reasonable amount of time. Use of an inert atmosphere adds a complication and an expense to the coating and curing process.

It has previously been discovered that UV curable epoxy functional silicones which are suitable for release coating applications fall into a narrow range of epoxy content and viscosity. The limits to these parameters are imposed by the necessity of coating 0.1 to 0.3 mil layers of these silicone fluids onto various substrates, and by the necessity for these formulations to cure quickly upon exposure to UV radiation and while adhering well to the substrate.

The requirement that these epoxy functional silicones be applied in thin coats dictates that the fluids be of low viscosity such as, for example, approximately 100 to 2,000 centistokes. Consequently, the epoxy functional silicones typically must be low molecular weight fluids. Also, the efficiency of the curing catalyst must be high in order to provide sufficient cross-linking and the formation of a tight, smear-resistant coating which adheres well to the substrate.

The present invention represents an improvement over U.S. Pat. No. 4,297,717 to Eckberg et al. wherein it has been discovered that small amounts, varying between 5 and 25 weight percent, of high viscosity pre-crosslinked epoxysilicones that incorporate blocks of long chain linear non-functionalized polydimethylsiloxane in their molecular structure, when dispersed in conventional low viscosity epoxy-functional silicones such as those taught in the Eckberg '717 patent, and photocured in the presence of compatible iodonium photocatalysts, provide a novel cured release coating requiring much lower force to initiate tear away or peel away from aggressive pressure sensitive adhesives than the force that would be required for a photocured low viscosity expoxysilicone coatings absent the high viscosity pre-crosslinked additives.

The requirement for a highly efficient photo initiator severely restricts the structure of the catalyst since it also must be capable of dissolving or dispersing well in the epoxy functional silicone fluid. U.S. Pat. No. 4,310,469 herein incorporated by reference discloses a UV initiated cationic ring opening curable curing mechanism for dimethyl epoxy chain-stopped linear polydimethylsiloxane fluids utilizing bisaryliodonium salts of the following formula, wherein $X=SbF_6$, $PF_6$ or $BF_4$ and wherein R is a $C_{(4-20)}$organo radical selected form alkyl and haloalkyl and mixtures thereof and n is a whole number equal to 1 to 5, inclusive. The catalysts described by Crivello are thick, high viscosity liquids or waxy solids which disperse poorly in the low molecular weight epoxy functional silicones utilized by the present invention. These catalysts exhibit the typical solubility characteristics of diaryliodonium salts, namely, being soluble in polar organic solvents such as chloroform and acetone but insoluble in non-polar organic solvents such as pentane, hexane and petroleum ether. Such solubility behavior severely limits the utility of these salts for initiating the rapid photocuring of epoxy functional silicone paper release compositions.

Although Crivello discloses that R may equal organo radicals selected from alkyl, haloalkyl and branched alkyl groups containing from 4 to 20 carbon atoms, the unique characteristics of "linear alkylate" bis(dodecylphenyl) iodonium salts such as are disclosed by the present invention are not recognized by Crivello. These bis(dodecylphenyl) iodonium salts will rapidly dissolve in the polysiloxane base polymer fluid and disperse throughout, thereby being an efficient photo initiator agent. Such salts are particularly well adapted for use with the novel epoxy functional silicone coating compositions herein provided.

Epoxy functional silicone paper release coating compositions must ordinarily have epoxy contents of less than approximately 16 weight percent because of the end uses to which such coatings will be put, namely, to serve as non-adherent surfaces capable of releasing aggressive pressure sensitive adhesives. When the epoxy content of the silicone compositions greater than about 16 weight percent, excessive force is required to remove adhesive coated articles from the cured silicone coatings. Note, however, that this may be a useful characteristic whenever it is desirable to selectively control the release characteristics of an adhesive.

It is therefore an object of the instant invention to provide low or premium release silicone coatings that are efficiently photocurable. It is another object of the present invention to provide ultraviolet light curable epoxy functional silicone coating compositions.

It is another object of the instant invention to provide ultraviolet light curable epoxy-functional silicone coating compositions.

It is a further object of the present invention to provide a process for the preparation of epoxy-functional silicone coating compositions incorporating long linear chain non-functional polydimethylsiloxane blocks in their molecular structure.

It is a further object of the instant invention to provide a method for rendering surfaces non-adherent to materials that would normally adhere thereto.

It is a further object of the instant invention to provide products possessing non-adherent surfaces comprising an ultraviolet light cured epoxy functional silicone coating.

These and other objects of the present invention will become apparent to those skilled in the art upon consideration of the following detailed description of the invention.

SUMMARY OF THE INVENTION

The epoxy functional polydiorganosiloxane fluids provided by the instant invention are more specifically dialkylepoxysiloxy- or trialkylsiloxy chain-stopped polydialkyl-alkylepoxysiloxane copolymers that also include long chain polydialkylsiloxane blocks that are free of an epoxide functionality in their structure. The epoxy functionality is obtained when certain of the hydrogen atoms on the polysiloxane chain of the polydialkyl-alkylhydrogen-siloxane copolymer are reacted with organic molecules that contain both an ethylenic unsaturation and epoxide functionality; via a hydrosilation addition reaction. Long chain polydialkylsiloxane blocks are incorporated into the epoxy-silicone structure by the hydrosilation of dimethylvinylsiloxy-chain stopped polydialkylsiloxanes with polydialkyl-alkyl hydrogen siloxanes prior to the reaction of the same polydialkyl-alkyl hydrogen siloxanes with olefin epoxide molecules. Such sequential hydrosilation reactions create a network structure of loosely crosslinked silicone bearing epoxy functional organic groups. The formation of such a loosely or partially crosslinked structure in this fashion constitutes the definition of the term pre-crosslinking as used in the instant specification. The term pre-crosslinked epoxysilicone thus means that there has been a partial crosslinking of the composition prior to the hydrosilation addition reaction of the olefinic epoxy monomer and that some silyl hydride groups remain intact or unreacted after the reaction leading to the pre-crosslinking has been completed. The term pre-crosslinked is equivalent to the term incompletely cured.

The ultraviolet light curable epoxyfunctional silicone fluid therefor comprises a pre-crosslinked epoxy-functional dialkyl-alkylsiloxy- or trialkylsiloxy- chain stopped polydialkyl alkylepoxy siloxane copolymer fluid that is the product of sequential hydrosilation reactions involving a polydialkyl-alkylhydrogen siloxane with a separate polydialkylsiloxane that includes ethylenically unsaturated groups, followed by reaction with an ethylenically unsaturated epoxide monomer.

The alkyl groups of the pre-crosslinked polydialkyl-alkylepoxide siloxane are preferably methyl groups. The ethylenically unsaturated group containing polydialkylsiloxane is preferably a vinyl containing polydialkylsiloxane, most preferably a vinyldimethyl-siloxy-chain stopped polydimethylsiloxane. The ethylenically unsaturated epoxy or epoxide monomer is preferably an unsaturated cyclo-aliphatic epoxy compound such as 4-vinylcyclohexene oxide (VCHO) vinylnorbornenemonoxide, limonenemonoxide, or dicyclopentadienemonoxide.

The hydrosilation reactions used for pre-crosslinking and subsequent functionalization of silylhydride containing polysiloxanes are preferably catalyzed by trace amounts of Group VIII noble metal compounds. By Group VIII noble metals, applicants define the group to consist of the elements ruthenium, rhodium, palladium, osmium, iridium, and platinum.

The vinyl functional silicone employed in the pre-crosslinking network synthesis may be selected from the group consisting of dimethylvinylsiloxy chain stopped polydimethylsiloxane, dimethylvinyl-siloxy chain stopped polydimethyl-methylvinyl siloxane, tetravinyl tetramethylcyclotetrasiloxane, and sym-tetramethyl divinyldisiloxane.

The hydrogen functional siloxane precursor fluid can be selected from the group consisting of tetrahydrotetramethylcyclotetrasiloxane, dimethylhydrogensiloxy chain stopped polydimethyl-methylhydrogen siloxane, trimethylsiloxy chain stopped polydimethyl-methylhydrogen siloxane, and sym-tetramethyldisiloxane.

When the pre-crosslinked epoxy functional silicone polymers described previously are combined with a miscible bis-aryl iodonium catalyst, the resulting mixture can be exposed to ultraviolet light to initiate a curing reaction that forms a solid silicone release coating.

Ultraviolet curable epoxy-functional silicone compositions of the instant invention may be applied to cellulosic or plastic film substrates including but not limited to supercalendered kraft (SCK) paper, glassine paper, polyethylene kraft (PEK) paper, polyethylene film, polypropylene film, and polyester film. A reaction, initiated by ultraviolet light, cures the liquid silicone release coating to form a solid non-adherent, i.e. abhesive, release surface on the substrate so coated.

Ultraviolet light curable silicone compositions are familiar to those skilled in the art. For example, U.S. Pat. No. 3,816,282 describes a room temperature vulcanizable (RTV) composition in which a mercaptoalkyl functional polysiloxane adds to vinyl functional polysiloxane in a photoinitiated free-radical process that employs standard free-radical initiators. Compositions such as these have been found to photo-cure too slowly for commercial paper release applications. Furthermore, mercaptoalkyl functional polysiloxanes often cause unpleasant odors that persist in the cured coatings derived therefrom.

Methacrylate functional silicones, such as those taught in U.S. Pat. No. 5,034,491 are also photo-curable in the presence of photo-initiators. Photocurable silicone compositions that are photocurable in the presence of the more common free-radical photo-initiators typically require stabilizers, e.g. hydroquinone. Typical common photoinitiators such as benzophenone and its derivatives are generally completely insoluble in silicone media, as a re most stabilizers. Low solubility leads to problems as to an appropriate choice of these necessary additives. Another problem associated with free-radical photocure silicone systems is the cure inhibition brought about by the presence of oxygen, which requires that the coated substrate be under an inert atmosphere such as nitrogen while undergoing ultraviolet radiation for a prompt cure response. While maintaining an inert atmosphere in an ultraviolet cure chamber is feasible, the requirement for an inert atmosphere adds complications and expense to a coating and curing process.

It has previously been discovered that ultraviolet curable epoxysilicone polymers such as those taught by Eckberg et al. in U.S. Pat. No. 4,279,717 are efficiently photocured in the presence of certain compatible onium-type cationic photocure catalysts without being subject to the drawback of being inhibited in the presence of oxygen. These epoxysilicone compositions are constrained within a narrow range of viscosity and epoxy content that is dictated by the need for a defect free coating that is about 0.1 to 0.3 mil thick coating of the polymers that can be applied to the substrate at high application speeds and by the necessity for these photocurable compositions to quickly photocure upon exposure to ultraviolet light while maintaining good adhesion to the substrate.

Three roll offset gravure or multi-roll film splitting application techniques commonly practiced for the high speed coating of solvent free silicones requires that the silicones be in the range of 100 to 2500 centistokes viscosity at the temperature where applied, rapid cure requires sufficient amount of reactive oxirane be present in the epoxy-silicone molecule to facilitate onium-type catalyst dissolution and to ensure a high reactivity of the system. If too much oxirane is reacted into the silicone fluid composition a photocured epoxy-silicone composition with the desired release performance will not result.

The instant invention is an improvement over U.S. Pat. No. 4,297,717, herein and herewith incorporated by reference, wherein it has been unexpectedly discovered that small amounts of high viscosity epoxysilicones, ranging from about 5 weight percent to 25 weight percent, provide a photocured release coating composition that requires considerably less force to separate it from an aggressive pressure sensitive adhesive (PSA) by comparison to a similar epoxy-silicone composition consisting solely of the low viscosity epoxy-silicone compositions. The high viscosity epoxy-silicone responsible for the unexpected excellent release performance incorporates significant levels of long chain linear blocks of polydimethylsiloxane blocks and is dispersed in low viscosity, and therefor low molecular weight, epoxy-silicone polymers that are lacking such long chains of polydimethylsiloxane.

The requirement for a prompt efficient photocure militates that is photoinitiators and photosensitizers be freely miscible with the photocrosslinkable compositions in which they are mixed, preferably forming clear solutions, but at least forming stable suspensions or dispersions. In the case of the epoxy-functional photocurable silicones of the instant invention, onium-type cationic photocatalysts must be compatible with the epoxy-silicone fluid. Iodonium salts of the general formula [(R-Ph)2I]+X- have been designed to address the miscibility issue where R is typically a mixture of various alkyl fragments derived from linear alkylate grade dodecylbenzene and generically called duodecyl although the mixture is not pure duodecyl. As a consequence of the impurity of the duodecylbenzene, the compounds exhibit a freezing point depression relative to the pure compound and thus tend to exist in a non-crystalline, amorphous, semi-fluid state that is freely miscible with the epoxysilicones of the instant invention. These dodecylbenzene iodonium cationic photocure catalysts are thus well-suited for use as photocatalysts for the ultraviolet cured epoxy-silicone release systems. The hexafluoroantimonate salts are most preferred for the compositions of the instant invention because they tend to combine high activity with excellent miscibility.

The UV curable epoxy functional silicone compositions of the present invention can than be applied to cellulosic and other substrates including paper, metal, foil, glass, PEK paper, SCK paper, and polyethylene, polypropylene and polyester films. A UV initiated reaction will cure the epoxy functional silicone compositions of the present invention and form a non-adherent, abhesive surface on the coated substrate.

When this pre-cross-linked epoxy functional silicone intermediate fluid is combined with an appropriate bisaryl iodonium salt, and, optionally, a second epoxysilicone fluid prepared without incorporation of long linear chain polydimethylsiloxane blocks in its molecular structure, an ultraviolet cure reaction can be initiated in order to form a final product such as a solventless silicone release coating.

DESCRIPTION OF THE PREFERRED EMBODIMENTS

Ultraviolet light curable silicone coating compositions of the present invention are obtained by combining an iodonium salt which is effective for catalyzing an ultraviolet light initiated cure reaction of the silicone coating composition, with a pre-crosslinked dialkylepoxysiloxy-or trialkylsiloxy- chain-stopped polydialkyl-alkyl epoxy siloxane fluid having a viscosity of approximately 100 to 100,000 centistokes at 25° C. and a polydialkyl-alkylepoxysiloxane fluid having a viscosity of approximately 10 to 2,000 centistokes at 25° C.

The preferred UV-light initiator or photocatalyst utilized by the present invention is a diaryl iodonium salt derived from "linear alkylate" dodecylbenzene. Such salts have the following general formula:

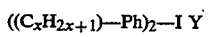

wherein x is an integer varying from about 6 to about 18, Y equals SbF6, AsF6, PF6, or BF4 and Ph stands for a phenyl group. These bis(4-dodecylphenyl) iodonium salts are very effective initiators for the UV cure of a wide range of epoxy functional silicones.

"Linear alkylate" dodecylbenzene is known commercially and is prepared by Friedel-Craft alkylation of benzene with a $C_{11}$-$C_{13}$ α-olefin cut. Consequently, the alkylate contains a preponderance of branched chain dodexylbenzene, but there may, in fact, be large amounts of other isomers of dodecylbenzene such as ethyldexylbenzene, plus isomer of undecylbenzene, tridecylbenzene and etc. Note, however, that such a mixture is responsible for the dispersive character of the linear alkylate derived catalyst and is an aid in keeping the material fluid. These catalysts are free-flowing viscous fluids at room temperature.

The bis-dodecylphenyl iodonium salts (II) are profoundly different from previously characterized diaryliodonium salts (I). They are both pentane-soluble and water-insoluble. The improvements in solubility and catalytic efficiency of these branched chain substituted salts are further underscored by comparison with analogous salts prepared from straight chain n-tridecylbenzene and n-dodecylbenzene. Two examples of these salts include bis(4-n-tridecylphenyl)iodonium hexafluoroantimonate which have a long linear hydrocarbon chains. These salts (I), in contrast to the new salts (II), are waxy solids which are neither pentane nor water-soluble, and which disperse very poorly in the epoxy funcional silicones utilized by the coating compositions of the present invention. These catalysts afford very sluggish UV cures when utilized for release coatings.

The UV curable silicone coating compositions of the present invention utilize novel epoxy functional silicone fluids which can be prepared in several ways. Epoxy compounds containing both unsaturation and oxirane such as 4-vinylcyclohexeneoxide, react with silylhydride functional polysiloxanes via a hydrosilation reaction. An analogous hydrosilation reaction between vinyl siloxane groups and silylhydride functional polysiloxanes is a well-known means of crosslinking or curing silicone polymers. This reaction may be used to partially crosslink silylhydride functional silicones and vinyl functional silicones creating thereby a lightly crosslinked network structure. The presence of an initial excess of silylhydride groups relative to the vinyl siloxane reactant creates a polymer with residual silyl hydride groups that may undergo subsequent addition with unsaturated epoxy compounds to produce epoxy functional silicones. The purpose of pre-crosslinking is to synthesize a silicone polymer that contains long nonfunctionalized chains of linear or only lightly branched polydimethylsiloxane as well as containing reactive epoxy groups.

The epoxy functional silicones can be prepared from other vinyl-or allylic-functional epoxy compounds containing olefinic moieties such as allylglycidylether or glycidyl acrylate, vinylnorbornene monoxide and dicyclopentadiene monoxide. Although cyclohexyl epoxy compounds are particularly useful, other vinyl-funcional cycloaliphatic epoxy compounds may also be used without significantly altering the properties of the product. The scope of the invention is not limited to the epoxide species used in the examples.

The epoxy functional polysiloxane intermediate fluids can be prepared in any of several ways. The following examples illustrate several of these methods but it must be understood that the present inventions are not limited by these examples. Those skilled in the art will be able to provide other epoxy functional silicone intermediate fluids upon consideration of these examples.

EXAMPLES

Example One: Preparation of Silicone Polymers for Release Coatings

Polymer 1: High Viscosity Pre-Crosslinked Epoxysilicone 100 parts of 20 centistoke viscosity silicone hydride fluid of approximate formula $MDH^H_4D_{15}M$, 0.19% H, was mixed with 80 parts of a vinyl stopped silicone fluid of approximate formula $M^{Vi}D_{150}M^{Vi}$ (800 centistoke viscosity). This mixture had a viscosity of 140 centistokes and was heated to 120° C. in the presence of a $RhCl_3(Bu_2S)_3$ catalyst (2 ppm Rh in the reaction mixture) for two hours. At the end of the reaction period, the viscosity of the reaction mixture had increased to 1000 centistokes. 4-vinylcyclohexene oxide (VCHO) and methyldicocamine, a stabilizer, were added such that after about three hours at 120°–140° C. the remaining SiH had been consumed by reaction with VCHO. Subsequent devolatilization of the siloxane light ends and excess VCHO yielded an epoxysilicone fluid with a viscosity of 4200 centistokes and an epoxy equivalent weight of 1157. The process of sequential hydrosilation to form a pre-crosslinked pre-reaction silicone network is taught in U.S. Pat. No. 5,085,924 herein incorporated by reference.

Polymer 2: Low Viscosity Premium Release Epoxysilicone

An epoxy functional silicone fluid was prepared by simple hydrosilation addition of VCHO to a preformed linear SiH polymer. The final product was a 490 centistoke fluid with an epoxy equivalent weight, having the approximate structural formula $M^ED_{60}D^E_4M^E$, where E refers to the ethylcyclohexene oxide substituents replacing the hydride functionality on the silicon derived from the reaction of vinylcyclohexene oxide with $M^H$ and $D^H$.

Polymer 3: Low Viscosity Pre-crosslinked Epoxysilicone

A pre-crosslinked epoxysilicone polymer analogous to polymer 1 was prepared by reacting 100 parts of a 16 centistoke fluid of the formula $M^HD_{20}D^H_3M$ with 16.7 parts of a 300 centistoke fluid, formula $M^{Vi}D_{100}M^{Vi}$ yielding a 60 centistoke lightly crosslinked silicone. Addition of vinylcyclohexene oxide to react with the remaining unreacted SiH groups in the reaction mixture ultimately provided a 300 centistoke epoxysilicone fluid having an epoxy equivalent weight of 900.

Polymer 4: Epoxy-stopped Silicone 2 moles of vinylcyclohexene oxide were reacted per mole of $M^HD_{50}M^H$ silicone fluid to yield a 100 centistoke epoxy-stopped silicone $M^ED_{50}M^E$ having an epoxy equivalent weight of 2050.

The following blend compositions were prepared:

Composition A: 50/50 blend of polymer 2/polymer 4; viscosity 220 centistokes, epoxy equivalent weight 1400.

Composition B: 95/5 blend of polymer 2/polymer 1; viscosity 550 centistokes, epoxy equivalent weight 1050.

Composition C: 90/10 blend of polymer 2/polymer 1; viscosity 640 centistokes, epoxy equivalent weight 1078.

Composition D: 80/20 blend of polymer 2/polymer 1; viscosity 840 centistokes, epoxy equivalent weight 1115.

100 parts of these compositions and also polymers 2 and 3 were blended with 1.5 parts of bis(dodecylphenyl)iodoniumhexafluoroantimonate (2-ethyl-1,3-hexanediol solution), as photocatalyst, was then applied to a polyethylene coated kraft paper (PEK) liner at a speed of 200 ft/min, by means of 3 roll offset gravure coating techniques well known to practitioners of the art, the coating being cured by being passed through the two ultraviolet light cure stations immediately after having been deposited on the moving substrate. About 0.7 lb/ream (1.1 g/m$^2$) coat weight was deposited on the PEK liner. The cured coatings were aged for eight days at room temperature and then laminated with Monsanto Gelva 1753 ® solvent-borne crosslinkable pressure sensitive adhesive (PSA) with a paper label stock placed on the adhesive layer. 2-inch wide strips of these laminates were cut and the force required to remove the silicone/liner lamina from the PSA/face stock lamina at a 400 inch/min pull rate and at an angle of 180° were periodically determined as the laminates were aged at ambient conditions. The results of the tests are presented in Table 1.

TABLE 1

RELEASE FORCE MEASUREMENTS FOR SILICONE RELEASE COATINGS

| Silicone Coating | Initial release g/2 in | 2 week Aged Release g/2 in | 4 week Aged Release g/2 in |
|---|---|---|---|
| Polymer 2 | 37.5 | 30.0 | 30.0 |
| Polymer 3 | 27.5 | 27.5 | 27.5 |
| Composition A | 85.0 | 77.5 | 77.5 |
| Composition B | 22.5 | 20.0 | 25.0 |
| Composition C | 17.5 | 17.5 | 17.5 |
| Composition D | 17.5 | 20.0 | 17.5 |

Silicone release coatings are generally classified as being "easy" or "tight" release depending on the amount of force or (work) required to remove an adhesive layer (as bonded to a face stock or label) from the silicone layer on the release liner. UV curable epoxysilicone release coating systems (polymers+cationic photocatalysts) are generally effective for easy release of many acrylic based pressure sensitive adhesives which is an advantage over most thermal-cured silicone release coatings and competitive acrylic modified silicone radiation cured release coatings. Nonetheless, UV cured epoxysilicone release coatings that are derived from polymers of types 2 and 3 do not provide the very easy or premium release converters desire from the most aggressive crosslinkable acrylic pressure sensitive adhesives that are increasingly used for demanding end use-use applications without compromising subsequent adhesion of the pressure sensitive adhesive in contact with the release liner.

The highest or tightest release recorded for any of these compositions was from composition A which possessed the lowest epoxy content. Blends of the high viscosity polymer 1 with polymer 2 provided the best, i.e. lowest, release of all the materials tested against the very aggressive acrylic pressure sensitive adhesive.

Further coating experiments were carried out utilizing three additional blends of polymer 1 and polymer 2.

Composition E: 92/8 blend of polymer 2/polymer 1
Composition F: 88/12 blend of polymer 2/polymer 1
Composition G: 84/16 blend of polymer 2/polymer 1

Procedures previously set forth were followed to evaluate laminate compositions with the change being that an Ashland pressure sensitive adhesive was used, 1085 acrylic. Results are set forth in Table 2.

TABLE 2

RELEASE FORCE MEASUREMENTS FOR SILICONE RELEASE COATINGS

| Silicone Coating | 1 Day g/2 in | 1 week Aged Release g/2 in | 4 week Aged Release g/2 in |
|---|---|---|---|
| Polymer 2 | 25.0 | 25.0 | 35.0 |
| Composition E | 20.0 | 20.0 | 25.0 |
| Composition F | 20.0 | 20.0 | 20.0 |
| Composition G | 20.0 | 20.0 | 20.0 |

Procedures previously set forth were followed to evaluate laminate compositions with the change being that a National Starch rubber based pressure sensitive adhesive was used, NSRB. Results are set forth in Table 3.

TABLE 3

RELEASE FORCE MEASUREMENTS FOR SILICONE RELEASE COATINGS

| Silicone Coating | 1 Day g/2 in | 1 week Aged Release g/2 in | 4 week Aged Release g/2 in |
|---|---|---|---|
| Polymer 2 | 25.0 | 30.0 | 30.0 |
| Composition E | 15.0 | 20.0 | 20.0 |
| Composition F | 10.0 | 10.0 | 10.0 |
| Composition G | 10.0 | 10.0 | 10.0 |

It is apparent that the low release obtained when using the Gelva 1753 pressure sensitive adhesive by blending low levels of high viscosity pre-crosslinked polymer 1 with polymer 2 (compared to polymer 2 by itself alone) is not anomalously linked to this one particular adhesive. The phenomenon of low release is also observed when the cure d coatings of these release coatings are laminated against either Ashland 1085 acrylic or National Starch rubber based pressure sensitive adhesive.

The pressure sensitive adhesives utilized in demonstrating the principles of applicants' invention may be further described as follows:

Monsanto Gelva 1753: a solvent borne aggressive permanent self-crosslinkable acrylic adhesive;

Ashland 1085: a solvent borne aggressive permanent acrylic adhesive; and

National Starch Rubber-Based: a solvent borne permanent natural rubber adhesive.

These adhesives vary from hard to release to mild in the order as follows: crosslinkable acrylic pressure sensitive adhesives are harder to release than non-crosslinkable acrylic pressure sensitive adhesives which are harder to release than rubber-based pressure sensitive adhesives.

Having described the invention that which is claimed is:

1. An ultra-violet curable silicone coating composition comprising:
   (a) a polydialkyl-alkylepoxysiloxane fluid having a viscosity of approximately 10 to 2,000 centistokes at 25° C.;
   (b) a pre-crosslinked dialkylepoxysiloxy- or trialkylsiloxy- chain-stopped polydialkyl-alkyl epoxy siloxane fluid having a viscosity of approximately 100 to 100,000 centistokes at 25° C.; and
   (c) an effective amount of a bis-(dodecylphenyl) iodonium salt photocatalyst said photocatalytic salt being selected from the salts of the group of acids consisting of hexafluoroantimonic acid, hexafluoroarsenic acid, hexafluorophosphoric acid, and tetrafluoroboric acid.

2. The composition of claim 1 wherein the ratio of components (a) and (b) ranges from 95 parts (a) to 5 parts (b) respectively to 75 parts (a) to 25 parts (b) respectively and an effective amount of a bis-(dodecylphenyl) iodonium salt photocatalyst said photocatalytic salt being selected from the salts of the group of acids consisting of hexafluoroantimonic acid, hexafluoroarsenic acid, hexafluorophosphoric acid, and tetrafluoroboric acid.

3. The composition of claim 1 wherein the epoxy substituent of the polydialkyl-alkylepoxysiloxane fluid, (a), is selected from the group consisting of 4-vinylcyclohexene oxide, vinylnorbornenemonoxide, limonenemonoxide, and dicyclopentadienemonoxide.

4. The composition of claim 1 wherein the epoxy substituent of the pre-crosslinked dialkylepoxysiloxy- or trialkylsiloxy- chain-stopped polydialkyl-alkyl epoxy siloxane fluid, (b) is selected from the group consisting of 4-vinylcyclohexene oxide, vinylnorbornenemonoxide, limonenemonoxide, and dicyclopentadienemonoxide.

5. The composition of claim 1 wherein the ratio of components (a) and (b) ranges from 90 parts (a) to 10 parts (b) respectively to 75 parts (a) to 25 parts (b) respectively and an effective amount of a bis(dodecylphenyl) iodonium salt photocatalyst said photocatalytic salt being selected from the salts of the group of acids consisting of hexafluoroantimonic acid, hexafluoroarsenic acid, hexafluorophosphoric acid, and tetrafluoroboric acid.

6. The composition of claim 1 wherein the ratio of components (a) and (b) ranges from 85 parts (a) to 15 parts (b) respectively to 75 parts (a) to 25 parts (b) respectively and an effective amount of a bis(dodecylphenyl) iodonium salt photocatalyst said photocatalytic salt being selected from the salts of the group of acids consisting of hexafluoroantimonic acid, hexafluoroarsenic acid, hexafluorophosphoric acid, and tetrafluoroboric acid.

7. The composition of claim 1 wherein the pre-crosslinked epoxy siloxane fluid, (b), is prepared by sequential reaction of, first, a vinylsilicone fluid selected from the group consisting of dimethylvinylsiloxy- chain stopped polydimethylsiloxane, dimethylvinylsiloxy-chain stopped polydimethyl-methylvinylsiloxane, tetravinyltetramethylcyclotetrasiloxane, and divinyltetramethyldisiloxane, with a silylhydride functional silicone selected from the group consisting of dimethylhydrogen- chain stopped polydimethylmethylhydrogensiloxane, trimethylsiloxy- chain stopped polydimethylmethylhydrogensiloxane, and tetramethyldisiloxane, followed by, second, reaction of silylhydride groups unreacted from said first reaction with an olefin epoxy compound.

8. The composition of claim 7 wherein the olefin epoxy compound is selected from the group consisting of 4-vinylcyclohexene oxide, vinylnorbornenemonoxide, limonenemonoxide, and dicyclopentadienemonoxide.

9. The composition of claim 8 wherein the epoxy substituent of the pre-crosslinked dialkylepoxysiloxy- or trialkylsiloxy- chain-stopped polydialkyl-alkyl epoxy siloxane fluid, (b) is selected from the group consisting of 4-vinylcyclohexene oxide, vinylnorbornenemonoxide, limonenemonoxide, and dicyclopentadienemonoxide.

* * * * *